US012669298B2

(12) United States Patent　　　(10) Patent No.:　US 12,669,298 B2
Clarke et al.　　　　　　　　　　　(45) Date of Patent:　Jun. 30, 2026

(54) EQUIPMENT AND METHOD USING ELASTIC TURBULENCE

(71) Applicant: Schlumberger Technology Corporation, Sugar Land, TX (US)

(72) Inventors: Andrew Clarke, Cambridge (GB); Adam Colbourne, Cambridge (GB); Mahdi Davoodi, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 1 day.

(21) Appl. No.: 18/978,909

(22) Filed: Dec. 12, 2024

(65) Prior Publication Data

US 2025/0198711 A1　　Jun. 19, 2025

(30) Foreign Application Priority Data

Dec. 15, 2023　(GB) ...................................... 2319341

(51) Int. Cl.
*F28F 13/12*　　　(2006.01)
*H01M 10/6568*　　(2014.01)
(52) U.S. Cl.
CPC ......... *F28F 13/12* (2013.01); *H01M 10/6568* (2015.04)
(58) Field of Classification Search
CPC ...................................................... F28D 1/035
See application file for complete search history.

(56) References Cited

U.S. PATENT DOCUMENTS

| 2013/0165536 | A1 | 6/2013 | Tonkovich et al. |
| 2014/0318167 | A1* | 10/2014 | Uchida .............. H05K 7/20309 |
| | | | 62/519 |
| 2016/0038904 | A1 | 2/2016 | Arora |

(Continued)

FOREIGN PATENT DOCUMENTS

| CN | 111446221 A | 7/2020 | |
| CN | 111928687 A | * 11/2020 ............... | F28F 9/22 |
| CN | 113446883 A | 9/2021 | |

(Continued)

OTHER PUBLICATIONS

Abed, W. M. et al., "Experimental investigation of the impact of elastic turbulence on heat transfer in a serpentine channel", Journal of Non-Newtonian Fluid Mechanics, Mar. 12, 2016, pp. 68-78, vol. 231.

(Continued)

*Primary Examiner* — Jianying C Atkisson
*Assistant Examiner* — Khaled Ahmed Ali Al Samiri
(74) *Attorney, Agent, or Firm* — Jeffrey D. Frantz

(57) ABSTRACT

A chamber, e.g. in a heat exchanger or flowing electrolytic half-cell, for through flow of a fluid which is capable of elastic turbulence has an internal structure with obstructions to compel flow to undergo successive changes of direction thereby applying stress to the flow of fluid through the chamber. The internal structure comprises an upstream portion in which the applied stress induces elastic turbulence to begin and a downstream portion which applies less stress per unit length and sustains the elastic turbulence while providing economy of pressure to propel the fluid. Configuration of the upstream portion may be planned with computer modeling so as to avoid formation of stagnant zones.

23 Claims, 12 Drawing Sheets

(56) References Cited

U.S. PATENT DOCUMENTS

2019/0237827 A1    8/2019   Ge et al.

FOREIGN PATENT DOCUMENTS

DE        10013440 C1 *   8/2001   ............... B01D 1/30
JP        6108135 B2      4/2017

OTHER PUBLICATIONS

"Abuga, J. G. et al., ""Benchmark solutions of the stabilized computations of flows of fluids governed by the Rolie-Poly constitutive model"", Journal of Physics Communications, Jan. 30, 2020, pp. 1-24, vol. 4."

Cruz, F.A. et al., "Influence of channel aspect ratio on the onset of purely-elastic flow instabilities in three-dimensional planar cross-slots", Journal of Non-Newtonian Fluid Mechanics, Dec. 2, 2015, pp. 65-79, vol. 227.

Davoodi, M. et al., ""Secondary flows due to finite aspect ratio in inertialess viscoelastic Taylor-Couette flow"", Journal of Fluid Mechanics, Oct. 30, 2018, pp. 823-850, vol. 857.

Debruler et al., "A Sulfonate-Functionalized Viologen Enabling Neutral Cation Exchange, Aqueous Organic Redox Flow Batteries toward Renewable Energy Storage", ACS Energy Letters, Feb. 13, 2018, vol. 3, Issue 3, pp. 663-668.

Dris, I, et al., "Flow of a viscoelastic fluid between eccentric cylinders: impact on flow stability", Journal of Non-Newtonian Fluid Mechanics, vol. 80, Issue 1, Dec. 1, 1998, pp. 59-87.

Fardin, M. A., et al., "Elastic turbulence in shear banding wormlike micelles", arXiv:1004.4662v1, Apr. 26, 2010, pp. 1-5.

Fetters, L. J. et al., "Chain Dimensions and Entanglement Spacings", In Physical Properties of Polymers Handbook, Mar. 21, 2007, pp. 447-454.

Groisman, A. et al., "Elastic turbulence in a polymer solution flow", arXiv:nlin/0104052v1, pp. 1-14, Apr. 22, 2001.

Jin, S. et al., ""A Water-Miscible Quinone Flow Battery with High Volumetric Capacity and Energy Density"", ACS Energy Letters, May 28, 2019, vol. 4, pp. 1342-1348.

Kerr, E. F. et al, "High energy density aqueous flow battery utilizing extremely stable, branching-induced high-solubility anthraquinone near neutral pH", ACS Energy Letters, Dec. 20, 2022, pp. 600-607.

Lv, X.L. et al., "Dextrosil-Viologen: A Robust and Sustainable Anolyte for Aqueous Organic Redox Flow Batteries", ACS Energy Letters, Jul. 5, 2022, vol. 7, Issue 8, pp. 2428-2434.

Magda, J.J. et al., "A transition Occuring in Ideal Elastics Liquid During Shear Flow", Journal of Non-Newtonian Fluid Mechanics, Oct. 2, 1988, vol. 30, pp. 1-19.

Rubinstein, M., "Polymers Physics", Oxford university press, Jun. 26, 2003, 58 pages.

Steinberg, V., "Elastic Turbulence: An Experimental View on Inertialess Random Flow", Annual Review of Fluid Mechanics, Jan. 5, 2021, vol. 53, pp. 27-58.

Xu L. et al . "A viscoelastic flow solver for Rolie-Poly model based on OpenFOAM", 2017 3rd IEEE International Conference on Computer and Communications (ICCC), Dec. 13, 2017, pp. 2945-2949.

* cited by examiner

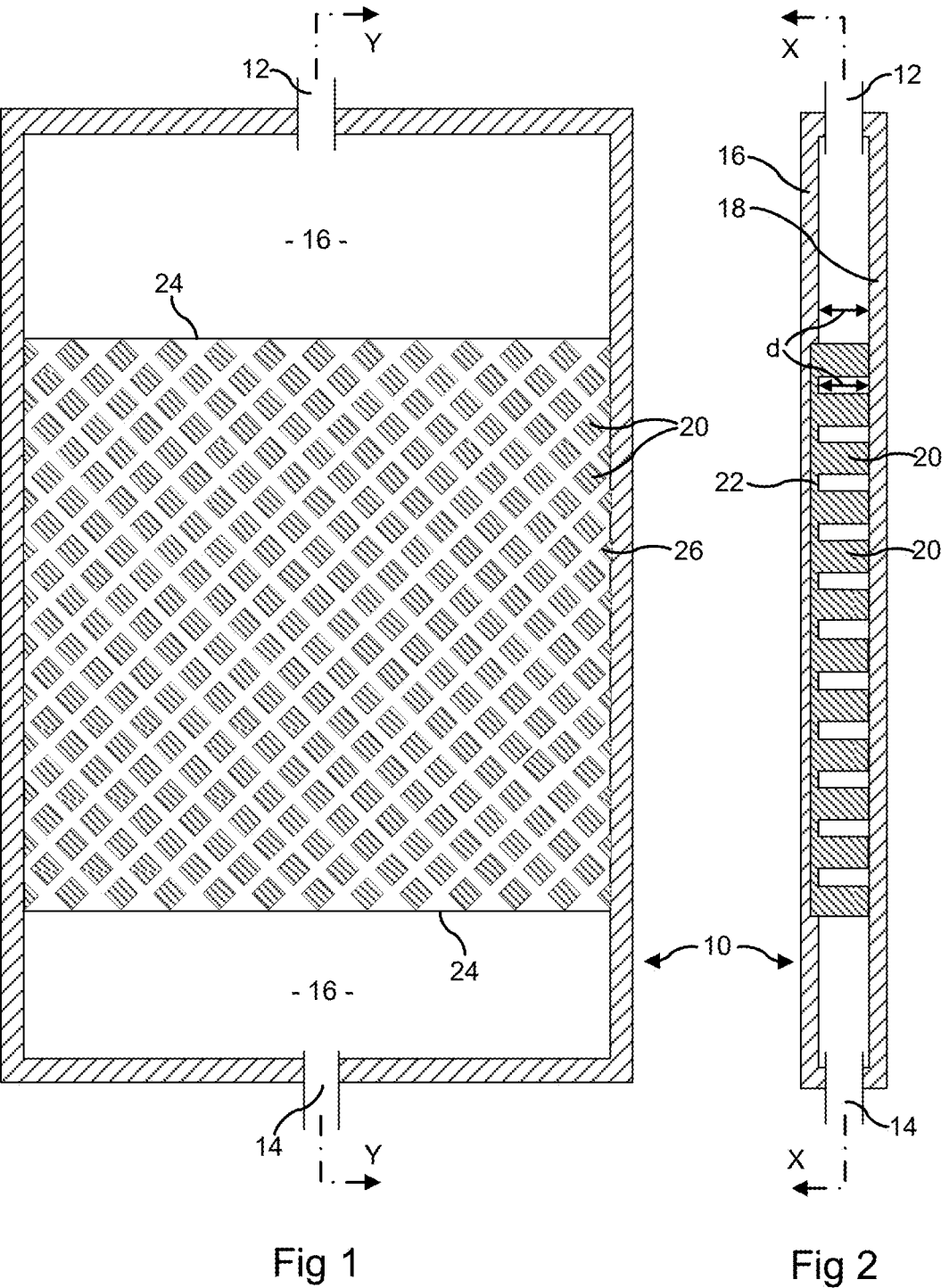
Fig 1                    Fig 2

EQUIPMENT AND METHOD USING ELASTIC TURBULENCE

CROSS-REFERENCE TO RELATED APPLICATIONS

The subject disclosure claims priority from GB Application No.: GB 2319341.0, filed on Dec. 15, 2023, herein incorporated by reference in its entirety.

FIELD

This disclosure is concerned with equipment, methods and systems in which a flowing fluid composition is induced to flow in a state of elastic turbulence.

BACKGROUND

The present disclosure uses the phenomenon of elastic turbulence. It is of course well known that Newtonian fluids such as water can undergo either laminar flow or turbulent flow. Such turbulent flow may be referred to as inertial turbulence. Conditions for laminar and turbulent flow are often expressed by Reynolds number which is a ratio of inertial to viscous forces within a fluid. Reynolds number has no dimensions because it is a ratio. At Reynolds number above about 2000 there is inertial turbulent flow. At Reynolds number below about 1500 a Newtonian fluid is in a state of laminar flow.

Elastic turbulence is a different physical phenomenon discovered at the end of the twentieth century. It has been observed at low flow speeds where Reynolds number is low and a Newtonian fluid would be in a state of laminar flow. Some early observations of elastic turbulence used the older term "elastic instability". However, that term is more general and includes other forms of instability in flow. Elastic turbulence occurs with fluids which are solutions containing dissolved molecules with one or more flexible long chains which can become entangled with other such molecules. The elastic turbulence is observed when such a fluid flows with a sufficient speed along a flow path which causes the stream lines of flow to change direction. A detailed discussion of elastic turbulence is provided by Steinberg in Annual Review of Fluid Mechanics, vol 53, pages 27-58 (2021).

Proposed uses of elastic turbulence have been mentioned in a number of documents which have focused on utilization of elastic turbulence in microfluidics, where dimensions of flow paths and rates of flow are so small that the volume in which elastic turbulence occurs is no greater than 10 ml and Reynolds number is vanishingly small, far below one.

SUMMARY

This summary is provided to introduce concepts that will be further elaborated and described below in the detailed description. This summary is not intended to be used as an aid in limiting the scope of the claimed subject matter.

Elastic turbulence may be used to enhance the transfer of heat energy into or from a flowing fluid or can be used to enhance the transport of chemical species through a solution to or from an electrode of a flowing electrochemical cell. The flowing fluid which is able to display elastic turbulence is a non-Newtonian fluid. It contains a solute which gives the fluid elastic properties and makes it possible to induce elastic turbulence. This solute may be a flexible long-chain linear polymer of high molecular weight. In order to cause elastic turbulence to occur the fluid may be pumped through a chamber in which there is an internal structure which causes the streamlines of flow to change direction and so applies stress to the fluid to initiate elastic turbulence. An aspect of the present disclosure provides a chamber for through flow of a fluid which is capable of elastic turbulence, wherein the chamber has an inlet, an outlet and an internal structure configured to compel stream lines of flow through the internal structure to undergo a plurality of successive changes of direction, wherein the internal structure comprises a first portion and a second portion which is downstream of the first portion and both are configured to apply stress to the flow of liquid through the chamber, and at least part of the second portion is configured to apply less stress per unit length in the overall direction of flow than the stress per equal unit length applied by the first portion.

For instance, if the first portion has a length $L_1$ and applies stress $S_1$ to the fluid flowing through the first portion, while a part of the second portion with a length $L_2$ applies a stress $S_2$, to the flowing fluid, the stresses per unit length are the ratios $S_1/L_1$ and $S_2/L_2$ where $S_1/L_1 > S_2/L_2$.

Stating this in a slightly different way, the stress $S_1$ applied by the first portion as the fluid flows over the length $L_1$ is greater than the amount of stress applied to the fluid by an equal length within the second portion (all the lengths mentioned being lengths in the direction of overall flow through the chamber).

The first portion may be at the upstream end of the internal structure. The second portion may be longer, in the overall flow direction, than the first portion. The second portion may be immediately downstream of the first portion, although it is possible that there is a transitional portion between the first and second portions.

The first portion can be used to apply stress to incoming laminar flow of fluid, so that it begins to flow through the internal structure in a state of elastic turbulence, and the stress applied by the second portion then sustains the elastic turbulence as the fluid flows through the second portion. This can provide a saving in pumping power compared to an arrangement where the stress applied per unit length is the same throughout the internal structure within the chamber.

The second portion, downstream of the first, may be shorter than the first portion, equal in length, or longer than the first portion. The second portion may continue to the downstream end of the internal structure. However, it is possible that the second portion is followed, in the direction of flow, by a third portion which applies more stress per unit length to the flowing fluid than does the second portion and then the third portion is followed by a fourth portion which applies less stress per unit length to the flowing fluid than the third portion. Such third and fourth portions are akin to a repetition of the first and second portions, although they could differ in construction or dimensions. They could enable the internal structure within a chamber to have greater overall length. Further repetitions downstream from the fourth portion are also possible.

Another aspect of this disclosure is a system comprising a fluid able to display elastic turbulence, a chamber as set out above and a pump to propel the fluid through the chamber.

A further aspect of the disclosure is a method for causing a fluid to display elastic turbulence, comprising pumping a fluid which contains a solute enabling the fluid to display elastic turbulence through a chamber as stated above at sufficient velocity to induce elastic turbulence of the flow through the first portion of the internal structure and maintaining elastic turbulence of the flow as it passes through the second portion.

We have now discovered, by computer modeling of flow through a hypothetical chamber with an internal structure comprising an array of obstructions which compelled the flow to change direction, that in some circumstances the elastic properties of the fluid can cause parts of the flow entering the internal structure of the chamber to form a stagnant zone or zones where there is little or no flow and so no elastic turbulence, while the remainder of the flow displays the intended elastic turbulence but passes around these zones of low flow.

In a further aspect, the present disclosure provides a method of designing a chamber intended for through flow of a fluid which contains a solute enabling the fluid to display elastic turbulence, the chamber having an inlet, an outlet and an internal structure to compel stream lines of flow through the chamber to undergo a plurality of successive changes of direction intended to cause elastic turbulence to occur, where the method comprises creating a computer model of flow of the fluid through part of a proposed internal structure and if necessary modifying the proposed internal structure until, after any modifications, the computer model predicts elastic turbulence over at least 80% and possibly at least 90% of a cross section transverse to the overall direction of flow through the proposed internal structure. The model may provide predictions for the whole internal structure or it may provide predictions for a portion of the structure which is intended to initiate elastic turbulence. It may be assumed, or possibly already known, that a downstream portion of the internal structure is able to sustain elastic turbulence provided this has been initiated in an upstream portion. Modification of a proposed internal structure may be changes of dimensions, changes of shape or a combination of the two. The method may subsequently be continued by constructing a chamber in accordance with the modified design.

All aspects of this disclosure may lead to, or enable, elastic turbulence within a first portion over at least 80% or at least 90% of a cross section transverse to flow with the elastic turbulence sustained in a downstream second portion. The overall volume in which there is elastic turbulence may then be at least 80%, and possibly at least 90% of the volume within the internal structure.

In some embodiments of this disclosure the volume within the internal structure of the chamber is at least 50 ml. It may be considerably more such as at least 250 ml and possibly at least one liter. The viscosity of the fluid, the flow rate of fluid through the chamber and the geometry of the internal structure may be such that Reynolds number (Re) for the flow through the internal structure of the chamber may be in a range from 1 to 1000, possibly at least 2 and possibly in a range from 2 up to 100, 250 or 500.

There are a number of possibilities for the construction of the first and second portions of the internal structure of a chamber. One possibility is that the first portion, the second portion, or both of them, comprise a plurality of obstructions to flow, with gaps between the obstructions allowing flow, but with obstructions positioned such that the flow is compelled to make multiple changes of direction. Width of the obstructions transverse to the overall dimension of flow may be greater than width of gaps between obstructions. Gaps between two obstructions may be aligned (in the overall direction of flow) with a further obstruction downstream which compels the flow through the gap to change direction.

Such obstructions may be positioned in an ordered array. A possibility is that the obstructions are arranged in rows, with the obstructions spaced apart to allow flow, and the obstructions in successive rows positioned to compel the flow to change direction. More specifically, the gaps between obstructions may be aligned, in the overall direction of flow, with obstructions in the next row. The first and second portions may both be provided by pluralities of spaced obstructions, with the obstructions or the gaps between them in the second portion being different from those in the first portion.

The individual obstructions may all have a cross sectional dimension of a millimetre or more.

Another possibility is that the upstream portion, the downstream portion or both of them comprises a mat or pad of a porous material, formed from filaments, such as threads or fibres, possibly with a width no greater than 0.5 mm, with a network of irregular pores between the fibres. A more specific possibility is that the upstream portion is such a mat or pad of porous material while the downstream portion is provided by spaced obstructions.

When the first and second portions of an internal structure differ from each other, but both of them comprise an array of obstructions and gaps between obstructions, there are a number of possibilities for difference between them. Gaps between obstructions in the second portion may be wider than gaps between obstructions in the first portion. Another possibility is that gaps in the first portion may have a smaller aspect ratio than gaps in the second portion, where aspect ratio is a ratio d/b where d is a dimension transverse to the overall flow direction but extending in the same direction as edges of obstructions and b is a dimension transverse to both the overall flow direction and the edges of obstructions. We have found that a low aspect ratio favors elastic turbulence without stagnant zones, and more specifically with an aspect ratio less than one, elastic turbulence may be induced over at least 80% of a cross section transverse to the flow direction.

Another possibility is that the configuration of the first portion compels the stream lines of flow to turn through a greater angle or with a tighter turn in which an average radius of curvature is less than in the second portion.

Obstructions may take the form of an array of pillars extending across the overall path of flow. Such pillars may have faces which meet at corner edges and flow is compelled to change direction as it goes around the corners. A different constructional possibility is for obstructions and gaps to be provided by a plurality of apertured plates positioned across the overall path of flow and arranged so that flow through an aperture in one plate is obstructed and compelled to turn by the next plate.

Internal structure within a chamber may include the first and second portions discussed above which induce and sustain elastic turbulence. The first portion may then begin at the inlet to an array of obstructions. However, it is possible that a chamber will contain other internal features, for instance flow guides for incoming or outgoing flow which are not intended to alter the laminar character of the incoming flow.

Chambers and systems as above, or designed in accordance with the above method may be used in many applications where mixing of a flow by turbulence is useful. One possibility, which is a further aspect of the present disclosure, is a device to transfer heat into or out of a flowing fluid through an interface which is a wall of a chamber as stated above. Another possibility, which is also a further aspect of this disclosure, is an electrochemical half-cell in which an electrode is in contact with the fluid in a chamber of a system as above and the fluid which is able to undergo elastic turbulence is an electrolyte containing a chemical species able to undergo electrochemical reaction at the electrode.

BRIEF DESCRIPTION OF DRAWINGS

FIG. 1 is a cross section, on the line X-X of FIG. 2, of a generally cuboidal chamber for through flow of fluid;

FIG. 2 is a cross section of the chamber on the line Y-Y of FIG. 1;

DETAILED DESCRIPTION

Figure 3:
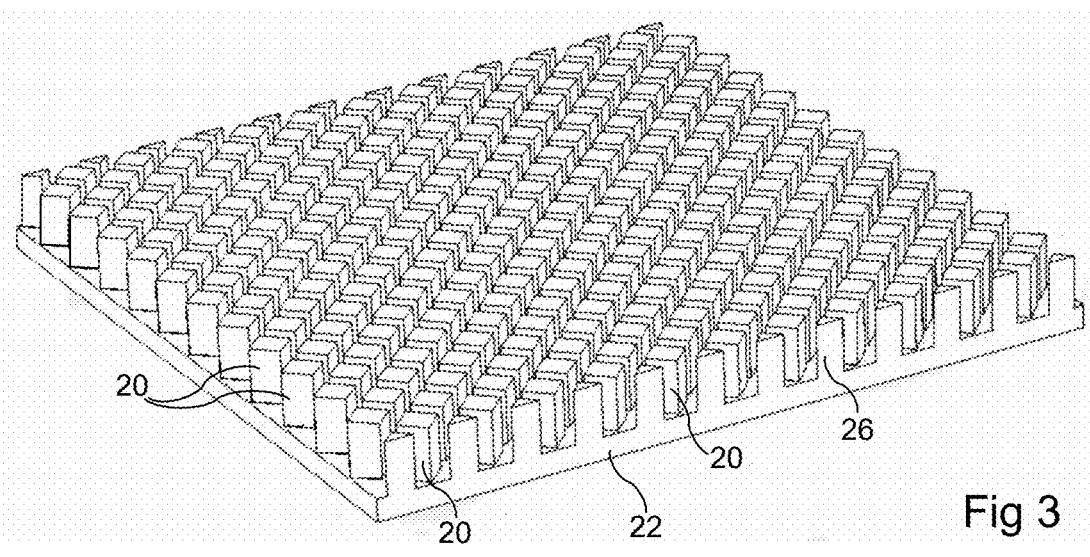
FIG. 3 is a perspective view of an array of pillars within the chamber.

This detailed description shows various embodiments of the present disclosure and possibilities which may be used. It should be appreciated that features or possibilities described in combination may, where it is practical to do so, be used individually. Also, features or possibilities described in any embodiment may be used in any other embodiment, in so far as it is practical to do so.

The phenomenon of elastic turbulence can be made to occur when a flowing liquid is a solution containing a solute which has a flexible structure able to undergo elastic deformation. One category of material able to undergo elastic deformation and enable a solution to display elastic turbulence is a polymer containing long flexible linear chains. The number of monomer units in the polymer may be at least 5000 and may be considerably more such as at least 25,000. The monomer units may be present in linear chains of at least 1000 monomer units which may each be connected one to the next by a single covalent bond, so that one monomer unit can rotate relative to adjoining monomer units. Individual linear chains may be longer and a polymer may contain a linear chain of at least 5000 or even at least 10,000 monomer units. The mean molecular weight of the polymer may be 106 Daltons or more. Such a polymer may have a mean molecular weight of at least 10 Megadaltons and possibly at least 15 or 17 Megadaltons. The concentration of such long chain/high molecular weight polymer included in a solution for enabling elastic turbulence to occur may be under 5% by weight, for instance in a range from 0.05% or 0.1% up to 1% or 2% by weight.

A long chain polymer which enables elastic turbulence to occur may be a polymer of a single monomer or may be a copolymer of more than one monomer, for instance a block copolymer which is linear. A polymer may include side chains attached to a long chain of monomer units which are connected together by single covalent bonds. A polymer may include some chain branching, for instance at branch points where three or more chains, each of at least 1000 monomer units and possibly at least 2000 or 5000 monomer units, are connected together.

The flexibility of the polymer chains enables the polymer molecules to become entangled. The flexibility of polymer chains can be described by means of a mathematical model. The freely jointed chain model is commonly used and the flexibility of a particular polymer can be indicated by parameters of an equivalent freely jointed chain (itself a mathematical model). A description of this approach is provided by Chapter 2 of "Polymer Physics" by Rubinstein and Colby, 2003, Oxford University Press. An equivalent freely jointed chain has the same mean-square end-to-end distance and the same maximum end-to-end distance as the actual polymer but is considered to include so-called Kuhn monomers which are freely rotatable relative to each other. These model monomers have a length, termed the Kuhn length, and a molar mass.

Polymers which enable elastic turbulence to occur may contain at least one flexible polymer chain with length and composition represented by at least 1000 Kuhn monomers having a Kuhn length less than 100 Angstroms (10 nm) and possibly at least 50 Angstroms. If a polymer is a single, unbranched chain, its length and composition may be represented by at least 5,000 Kuhn monomers having a Kuhn length less than 100 Angstroms and possibly considerably more, such as at least 20,000 Kuhn monomers of such Kuhn length.

Elastic turbulence has been observed with several different long chain polymers in solution. One such polymer is polyacrylamide, which may be hydrolyzed or partially hydrolyzed. Experimental evidence for elastic turbulence in a solution of high molecular weight polyacrylamide was given by Groisman and Steinberg in "Elastic Turbulence in a polymer solution flow" Nature, Vol 45 p53 (2000). Other instances of long chain polymers reported to give rise to elastic turbulence include polyisobutylene of molecular weight 4 to 6 Megadaltons dissolved in an organic solvent (Dris and Shaqfeh, J. Non-Newtonian Fluid Mech. Vol 80 pages 1 to 58 (1998)), polystyrene of molecular weight 18

Megadaltons in an organic solvent (Magda and Larson, J. Non-Newtonian Fluid Mech. Vol 30 pages 1-19 (1988)) and polyethylene oxide of molecular weight 4 MegaDaltons in an aqueous solution (Davoodi et al, J. Fluid Mech. Vol 857, pages 823-850 (2018)). Kuhn lengths for polystyrene and polyethylene oxide given by Rubinstein and Colby, page 53 are 18 Angstroms and 11 Angstroms. Kuhn length for polyacrylamides has been reported as 15 to 25 Angstroms (Fetters, Lohse and Colby, Chain Dimensions and Entanglement Spacings. In Physical Properties of Polymers Handbook; Mark, J. E., ed.; Springer: New York, 2007; pages 447-454).

When using a long chain linear polymer to enable elastic turbulence to occur, it is desirable to include a biocide to protect the polymer from biodegradation.

Long chain partially hydrolyzed polyacrylamide linear polymers with a molecular weight of more than one Megadalton are available from SNF Floerger, whose headquarters are in Andrdzieux, France. Available polymers which may be used may have a mean molecular weight of at least 10 or 15 Megadaltons and include Flopaam3630 which has mean molecular weight of 18 to 20 Megadaltons.

Elastic turbulence has also been observed with solutions containing a surfactant which forms worm-like micelles in solution. An example, using cetyl trimethyl bromide as the surfactant, is mentioned by Favolin et al in Physical Review Letters Vol 104 178303 (2010).

When a solution contains a substance able to cause elastic turbulence, the phenomenon of elastic turbulence occurs if the solution is flowing at a sufficient flow velocity (which may be a low velocity) and the path of flow causes the streamlines of the flow to curve. Consequently, one known possibility for a flow path which induces elastic turbulence is a serpentine channel. Another possibility is an array of obstructions to flow, which compel the flow to change direction. Flow through a porous material is a further possibility because the irregular porous structure compels the flow to make many changes of direction.

Computational fluid dynamics, frequently abbreviated to CFD, is an approach which creates a computer model of flow of a fluid through a defined geometry (and can also be used to model fluid movement around a moving object). The geometry through which the fluid flows is notionally divided into a two or three dimensional mesh of cells and flow through these cells is computed using equations which represent the conservation laws of physics, notably that mass is conserved, the rate of change of momentum equals the sum of forces acting on the fluid (Newton's second law) and the rate of change of energy is the sum of the rate of heat addition to the fluid and the rate of work done on the fluid.

Constructing a model usually has three stages. A first pre-processing stage includes input of necessary information including the geometry through which the fluid flows, characteristics of the input flow, in particular the velocity of flow, and characteristics of the fluid which is flowing. The next stage is the main data processing stage involving the solution of mathematical equations, which may be completed by an iterative procedure. The third stage is data output. This is often completed by displaying the predicted flow with a chosen range of coloring to indicate the magnitude of a computed parameter such as temperature or flow velocities in the notional cells.

Computer programs for CFD are often referred to as a solver because a large part of the computing is the solving of equations. Constructing a model also requires choice of an appropriate solver. A considerable number of solvers are available, appropriate to fluids of different kinds and the modeling of various parameters of the flow. Software for CFD is available from a number of sources. In addition to commercial software products, open source software is widely used. Open Source Field Operation and Manipulation (OpenFOAM) C++ libraries available at www.openfoam.com provide a range of solvers and related software.

Because CFD relies on fundamental equations of physics, it can be used to predict the nature of flow within a geometry. This has frequently been used for Newtonian fluids. CFD can also be used to predict flow of a fluid with elastic properties, such as a fluid containing a solute which enables the fluid to display elastic turbulence. Solvers for CFD relating to fluids with elastic properties have been described in scientific literature, for instance Xu et al "A Viscoelastic Flow Solver for Rolie-Poly Model Based on OpenFOAM" 2017 3rd IEEE International Conference on Computer and Communications, and Abuga and Chinyoka "Benchmark solutions of the stabilized computations of flows of fluids governed by the Rolie-Poly constitutive model" J. Phys. Commun. 4 (2020) 015024.

Figure 4:
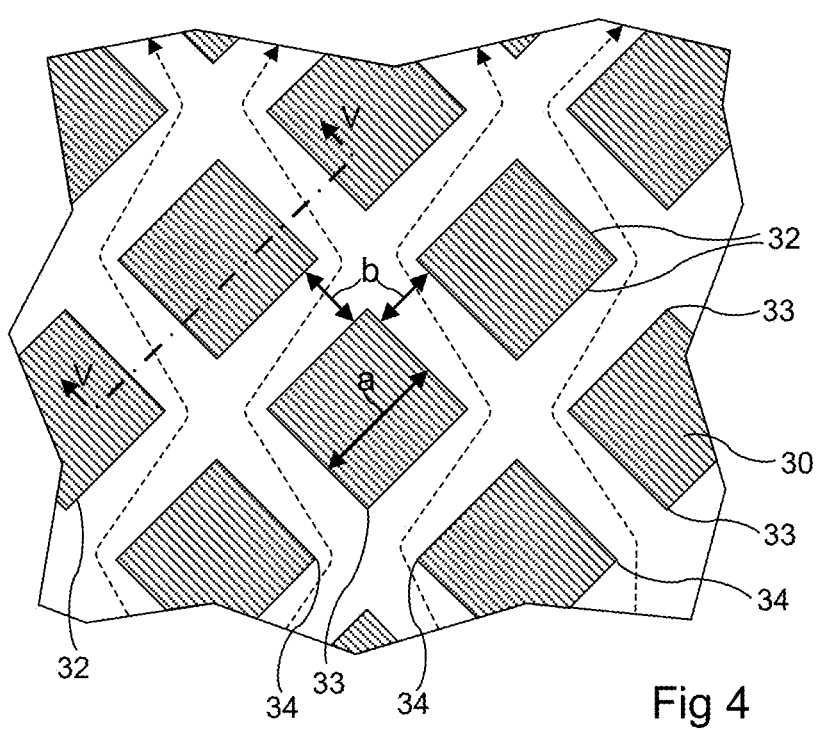
FIG. 4 is an enlargement of a part of FIG. 1.

Referring now to the drawings, FIGS. 1 and 2 show an example of a generally cuboidal chamber 10 for flow of a fluid from an inlet 12 to an outlet 14. The opposite large walls of the chamber are indicated as 16 and 18. Within the chamber is an array of obstructions which are pillars 20 of square cross section attached to a base plate 22 recessed into the wall 16. Edges of the base plate 22 are indicated 24 in FIG. 1. The pillars extend from the base plate, across the chamber to the opposite wall 18. Pillars 26 of triangular cross section are provided at each side edge of the array. The pillars 20 and base plate 22 are shown in a perspective view by FIG. 3. FIG. 4 is an enlargement of part of FIG. 1 diagrammatically illustrating paths of flow.

In this example, the flat side faces 32 of the pillars had a width "a" as indicated in FIG. 4 of 1.5 mm and the height of the pillars, which is the distance "d" from the base plate 22 to the tops of the pillars 20 which abut the opposite wall 18 of the chamber 10, was 3 mm which is the same as the spacing between the walls 16, 18 of the chamber 10 upstream and downstream of the array of pillars. The face-to-face gap width "b" between the confronting faces 32 of adjacent pillars was 1 mm and so the aspect ratio d/b of the face-to-face gaps between pillars was 3. The edge-to-edge gap between adjacent corner edges 34 of pillars 20 was $\sqrt{2}=1.41$ mm. A full line of pillars transverse to the overall direction of flow contained twelve pillars 20 with eleven edge-to-edge gaps between corner edges 34, and so the total cross section available for flow into the array between edges 34 of pillars 20 in the first row (i.e. the row nearest to the inlet 12 of the chamber) was $11\times7\times1.41$ mm$^2$.

RheoFOAM is an open source solver for modeling flow of elastic fluids. It is included in the RheoTool software available at https://github.com/fppimenta/rheoTool. A solver of this type was used to model the flow of an aqueous solution containing a high molecular weight polyacrylamide through the array of pillars shown in FIGS. 1 to 5. The constitutive equation used by this solver to represent the elastic properties of the fluid was the well-established Oldroyd B model. It was assumed that flow arriving at the array was laminar and moving at the same velocity over the entire cross section of the chamber 10.

Initial inputs to the solver were:
the geometry of the array, provided as a CAD drawing,
the dimensions of pillar height, width and spacing,
a chosen velocity of the incoming fluid flow,
experimentally determined fluid properties, which were
density, viscosity of the aqueous solvent, viscosity contribution from the polymer (viscosity of the solution minus viscosity of the solvent) and relaxation time of the solution.

Figure 6A:
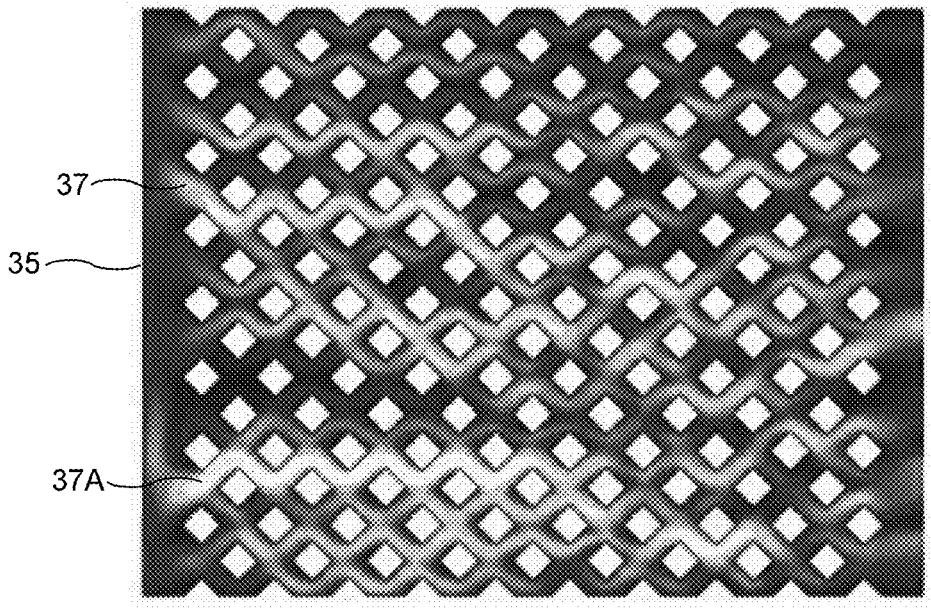
FIG. 6A shows graphic output of a computational solver, modeling an array of obstructions when stagnant zones occur.
Figure 6B:
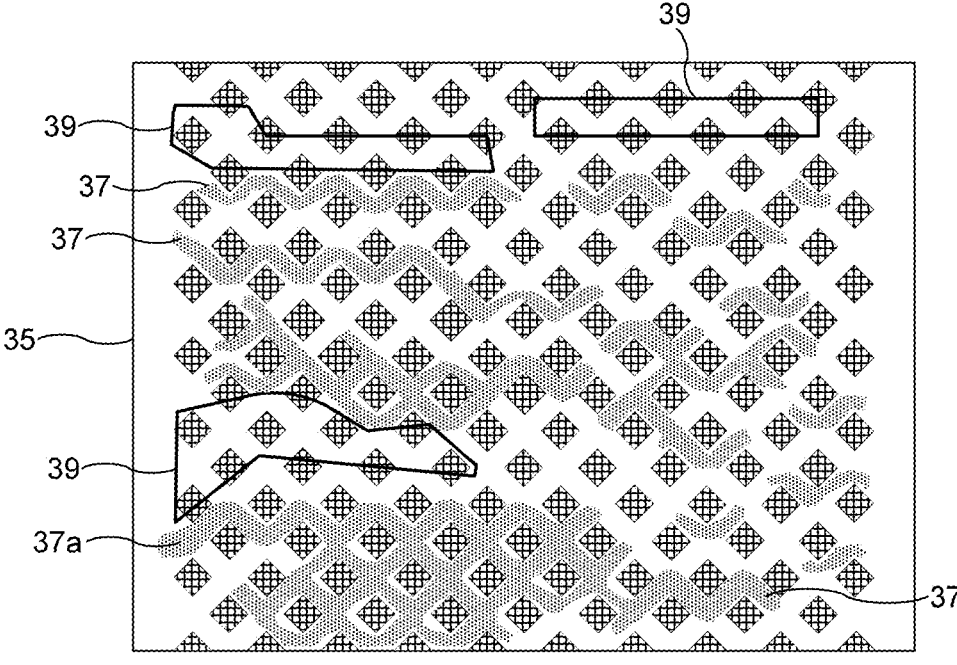
FIG. 6B is a simplified diagrammatic version of the output shown by FIG. 6A.

The solver provided predictions of fluid velocities within the array of obstructions. FIG. 6A reproduces graphic output showing this prediction of fluid velocities in a plane midway between the walls 16, 18. Flow velocity at every location within the array is depicted using a scale ranging from dark grey for the lowest velocity and progressively lighter shades of grey for higher velocities, up to white for the highest velocity. It can be seen that although the incoming flow upstream of the array was of uniform velocity, flow through the array was predicted to have considerable variation of velocity. FIG. 6B is a diagrammatic representation of FIG. 6A to assist explanation.

On a velocity scale from 0 to 0.01 m/sec, the overall flow rate arriving at the inlet end 35 of the array was about 0.004 m/sec. Regions 37 where the flow rate was greater than 0.006 m/sec are shown shaded in FIG. 6B and regions within the outlines 39 were stagnant zones with flow rates below 0.002 m/sec. A particularly prominent faster flow is indicated at 37A.

We believe that these stagnant zones of low flow and the desired elastic turbulence are both phenomena brought about by elastic instabilities of the fluid. Experimental work has indicated to us that elastic turbulence is favored when an elastic fluid is subjected to shear stress while the formation of stagnant zones is favored by extensional stress of the fluid.

Figures 5, 7, 8, 9, 10, 11:
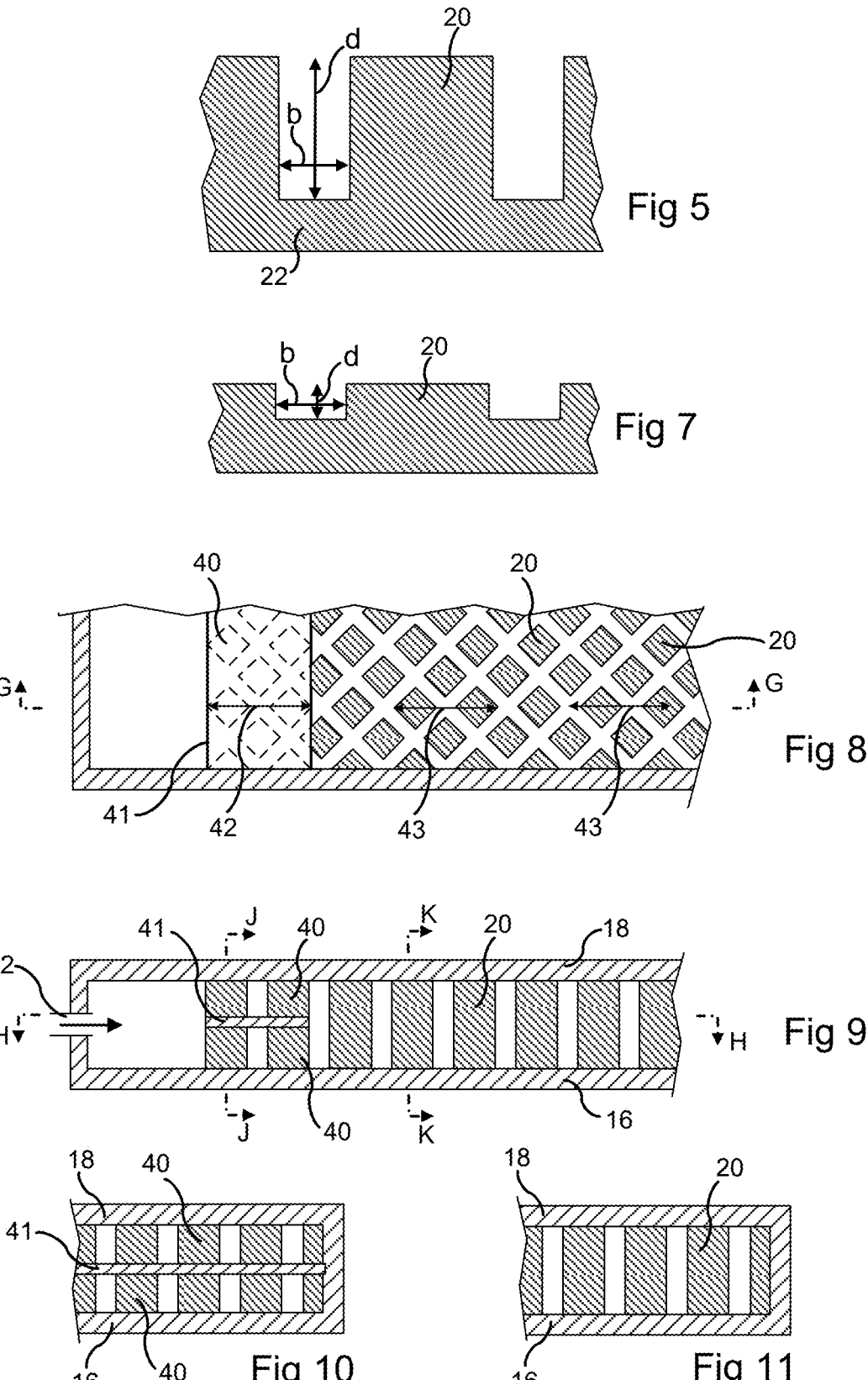
FIG. 5 is an enlarged cross section on line V-V of FIG. 4.
FIG. 7 is an enlarged cross section as in FIG. 5 when face-to-face gaps between obstructions in an array have an aspect ratio less than one.
FIG. 8 is a cross section, on the line H-H of FIG. 9, of part of a chamber for through flow of fluid.
FIG. 9 is a cross section of part of the chamber on the line G-G of FIG. 8.
FIG. 10 is a cross section of part of the chamber on the line J-J of FIG. 9.
FIG. 11 is a cross section of part of the chamber on the line K-K of FIG. 9.

Another possible example embodiment has the same layout of pillars as in FIGS. 1 to 5, but the height of the pillars 20, 26 is considerably reduced as shown by FIG. 7 and so the aspect ratio of height "d" to the width "b" of the face-to-face gaps between two pillars is also less. In this example the height "d" is 0.5 mm and the width "b" is 1 mm and so the aspect ratio d/b is 0.5. Normal stress due to shear between the top and bottom walls 16, 18 is dependent on $$\text{velocity } U/\text{gap-height } d$$

and so reducing the height increases the shear stress. Elongational strain is governed by the flow field where shear rate is zero, such as at the midpoint of the gap, and in consequence is dependent on $$\text{velocity } U/\text{gap-width } b$$

Reducing the aspect ratio by reducing the height d to 0.5 mm while leaving the flow velocity and gap width unchanged favors the formation of elastic turbulence instead of stagnant zones. The computation was carried out again using this reduced value of height d. The predicted flow velocities through the array of pillars no longer included low velocity stagnant zones.

The internal structure, such as an array of obstructions, causing elastic turbulence will create some resistance to flow and so causes a drop in pressure as a pumped flow passes through the array of obstructions. Consequently, pumping a fluid through an array of obstructions so as to induce elastic turbulence will require more pumping power than would be required for pumping a laminar flow through an empty chamber. Reducing the height of gaps while leaving width unchanged, as mentioned above, will increase the flow resistance and the required pumping power. In some embodiments of this disclosure, a first portion of the internal structure, at its upstream end, is an array of obstructions and a second portion, downstream of the first portion, is a different array of obstructions. The first portion is configured to induce elastic turbulence without stagnant zones. The downstream second portion receives flow which is already in a state of elastic turbulence and so can be configured to sustain rather than induce such turbulence. In such circumstances resistance to flow arising from the upstream first portion may be greater than resistance to flow arising from an equal length within the downstream second portion of the array of obstructions.

A number of constructional arrangements to provide a first portion which is different from a downstream second portion are shown by FIGS. 8 to 19. These drawings are intended to show various possibilities for internal structure within a chamber, but may not show dimensions which will bring about elastic turbulence. One such arrangement is shown by FIGS. 8 to 11. An upstream first portion of the internal structure is the first three rows of an array of pillars with a square cross section. These first three rows are formed of short pillars 40 on each side of a plate 41 which is parallel to chamber walls 16, 18 and mid-way between them. In FIG. 8, a surface of this plate is seen and the short pillars 40 behind the plate 41 are shown by broken lines. As can be seen from FIG. 10, the gaps between the short pillars 40 in these first three rows extend for a distance from the plate 41 to a chamber wall 16, 18. This is less than half the distance between the chamber walls 16, 18. As shown by FIG. 11, in the second portion which is the array of pillars downstream from the plate 41, the pillars 20 extend the full distance from the chamber wall 16 to the opposite chamber wall 18.

As an example, the face-to-face spacing between pillars 20 and likewise the face-to-face spacing between the short pillars 40 is 2 mm. The height of pillars 20 is the distance between the chamber walls 16, 18 and is 7 mm. The height of the short pillars 40 is the distance from the plate 41 to the walls 16, 18 and is 3 mm. Consequently in the upstream first portion of the array the gaps between the short pillars 40 have an aspect ratio of 3 mm/2 mm=1.5 and in the second portion the gaps between the pillars 20 have an aspect ratio of 7 mm/4 mm=3.5. The first portion of the internal structure has a length in the flow direction indicated by line 42. The lower aspect ratio of the gaps between pillars 40 in this first portion leads to more shear stress on the flowing fluid than on fluid flowing through an equal length of the second portion, such as either of the lengths indicated by lines 43. When fluid containing a high molecular weight flexible polymer is pumped through the chamber from its inlet 12, the upstream first portion of the array with short pillars 40 induces elastic turbulence and the downstream second portion sustains the elastic turbulence until the fluid reaches the downstream end of the array. The pressure drop as the fluid flows through the first portion 40 is greater than the pressure drop as the fluid flows through either of the lengths 43 of the second portion. Stating this in a slightly different way, the shear stress applied to the fluid per unit length and the pressure drop per unit length are both greater in the first portion than in the second.

Figure 12:
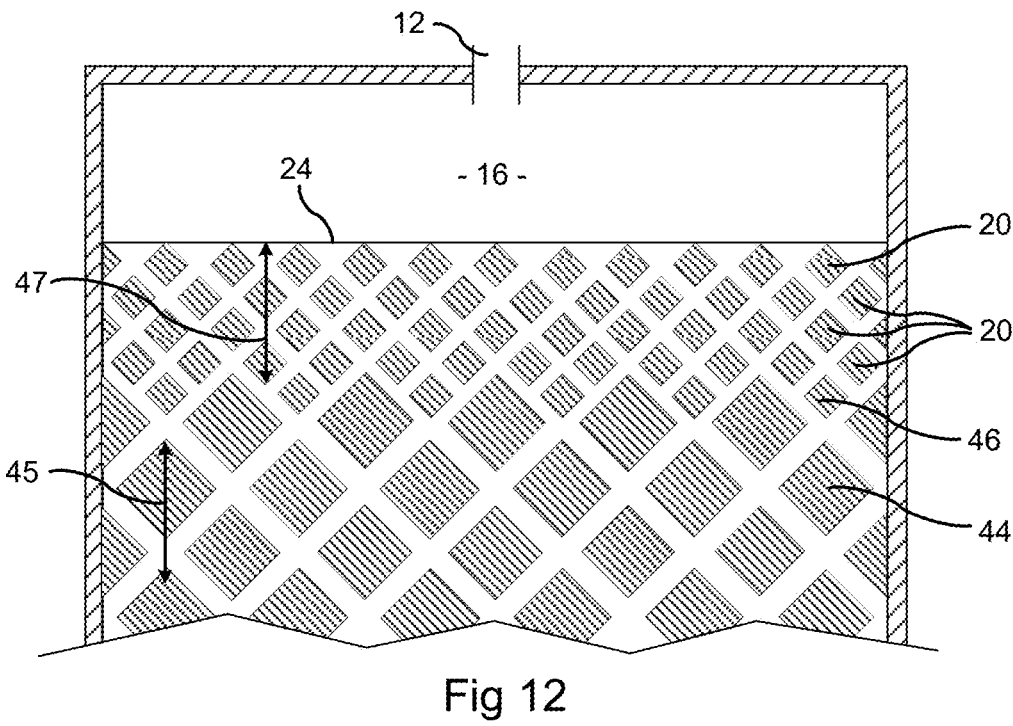
FIG. 12 is a cross section of part of a cuboidal chamber for through flow of fluid.

In the constructional arrangement of FIG. 12, the upstream first portion of internal structure within a chamber is four rows of pillars 20 of square cross section. The second portion is a succession of rows of larger pillars 44 also of square cross section and dimensioned so that the face-to-face width of gaps between these pillars is larger than the face-to-face width of gaps between the pillars 20. In this embodiment there is a transitional row between the first portion of the internal structure including the first pillars 20 and the second portion including the pillars 44. In this transitional row there are pillars 46 which continue the pattern of the first portion into the first row of pillars 44. The shear stress applied to flowing fluid by the first portion, which has length 47, is greater than the amount of shear stress applied by any equal length in the second portion, for example, the length 45, and so the pressure drop per unit length as the fluid passes through the first portion is greater than the pressure drop per unit length as the fluid passes through the second portion.

Figure 13:
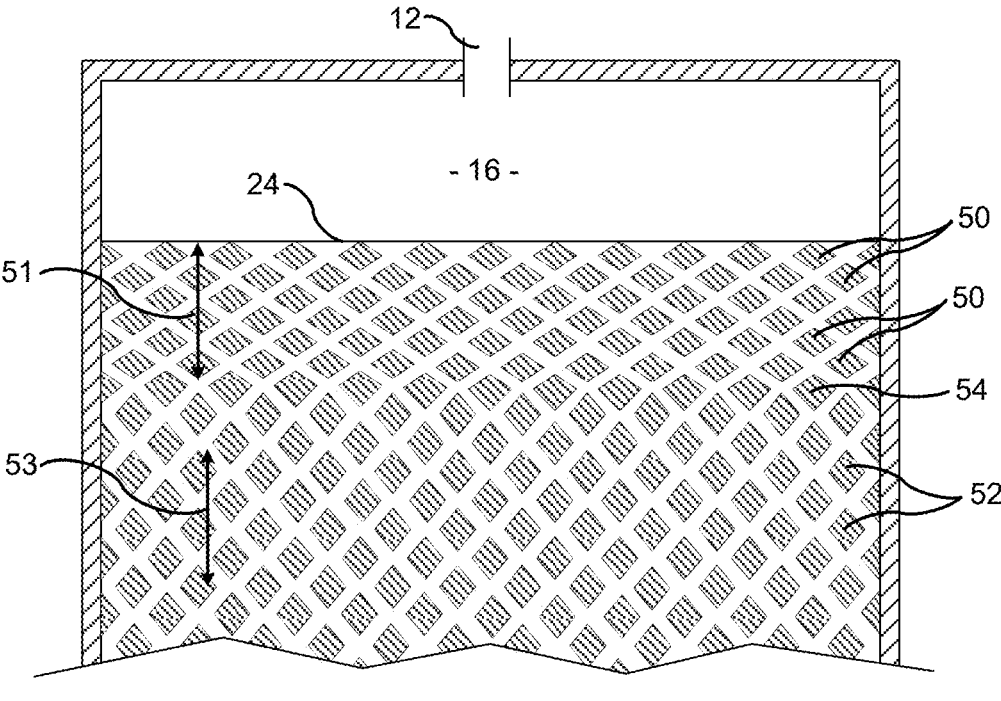
FIG. 13 is a cross section of part of another cuboidal chamber for through flow of fluid.

FIG. 13 shows a constructional arrangement in which pillars within a chamber differ in shape. The upstream, first portion of the internal structure has five rows of pillars 50 with a rhombus cross section. The width each pillar 50 across the chamber (i.e. transverse to the overall flow direction) is the longer diagonal of the rhombus. The length of the first portion, in the overall flow direction, is indicated by line 51. The downstream second portion of the internal structure includes an array of pillars 52 which have the same rhombus cross section, but oriented so that the longer diagonal lies in the overall direction of flow.

When the first pillars 50 compel the flowing fluid to change direction, the turn is tighter and has a smaller average radius of curvature than when the second pillars 52 compel the flowing fluid to change direction. The shear force on the fluid as it turns is inversely dependent on the radius of curvature and so the changes of flow direction caused by the first pillars 50 apply more shear force to the flowing fluid as it travels the length 51 through the first portion than do the changes of direction caused by the pillars 52 in any equal length, such as length 53 of the second portion.

Figure 14:
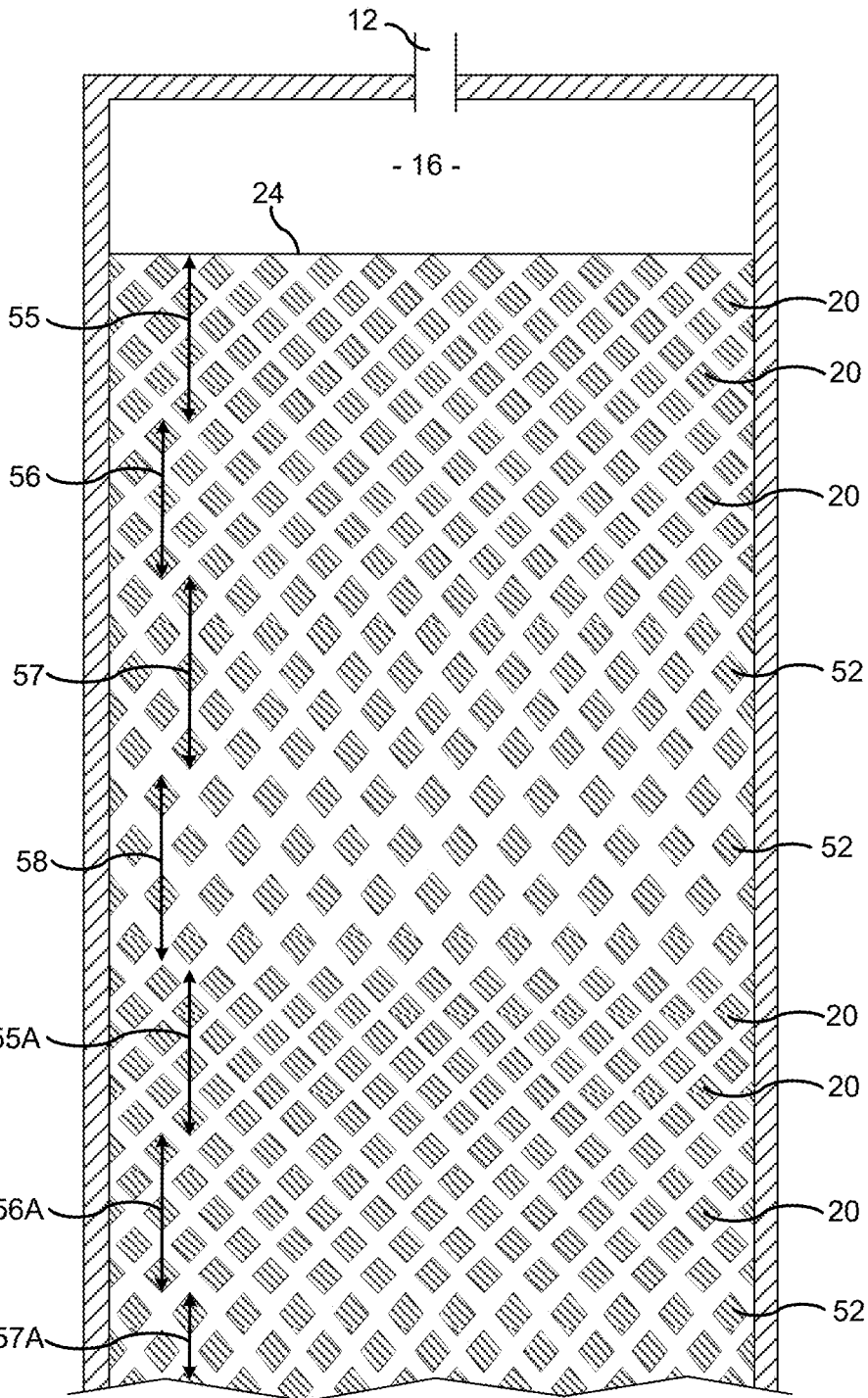
FIG. 14 is a cross section of part of yet another cuboidal chamber for through flow of fluid.
Figure 15:
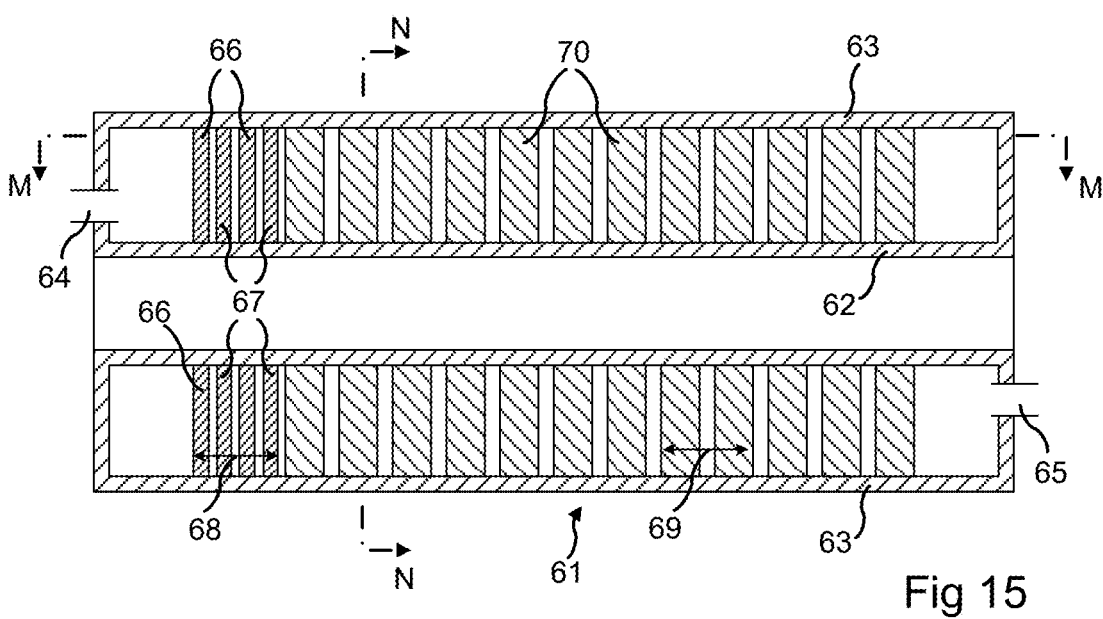
FIG. 15 is a cross section of a chamber with an annular cross section.

FIG. 14 shows a constructional arrangement illustrating further possibilities. There is a first portion with length indicated by line 55, formed by six rows of pillars 20 of square cross section. This first portion induces elastic fluid entering from inlet 12 to change from laminar flow to a state of elastic turbulence over at least 90% of the cross sectional area for flow. Next in the direction of flow there is a second portion of the internal structure which sustains the elastic turbulence. This portion has three subsections. A length indicated by line 56 is formed by more of the square pillars 20, but the rows of these pillars are at a greater spacing in the flow direction than the rows in the length 51 which is first portion. The next subsection, indicated by line 57, is formed by rows of pillars with rhomboid cross section, as used in FIG. 13, with their longer diagonal aligned with the overall flow direction. This is followed by a further subsection 58 also formed by rows of pillars 52 but with a greater spacing in the overall flow direction than in the length 57. These subsections of the second portion with lengths 56, 57 and 58 all compel the flow of fluid to change direction and so apply shear stress to the fluid to sustain the elastic turbulence induced by first portion 55, but the angle of direction change, and so the amount of shear stress applied to the fluid, diminishes from length 56 to length 57 and again from length 57 to length 58.

A possibility, not shown in FIG. 14 is that the length 58 is the final length of the second portion of the internal structure within the chamber and fluid then flows to an outlet from the chamber.

Shown in FIG. 14 is another possibility, which is that there is a repeat of the lengths 55, 56, 57 and 58. Thus in FIG. 14 the length 58 is followed by a length 55A which is a third portion of the internal structure and is identical to the first portion. This is then followed by a fourth portion beginning with length 56A which is identical to subsection 56. Subsequent lengths are identical to lengths 57 and 58. Part of length 57A is visible in FIG. 14.

Figure 16:
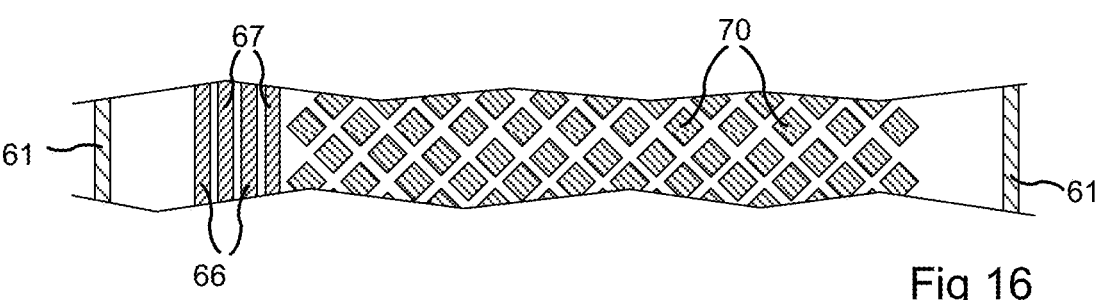
FIG. 16 is a cross section on line M-M of FIG. 15.
Figure 17:
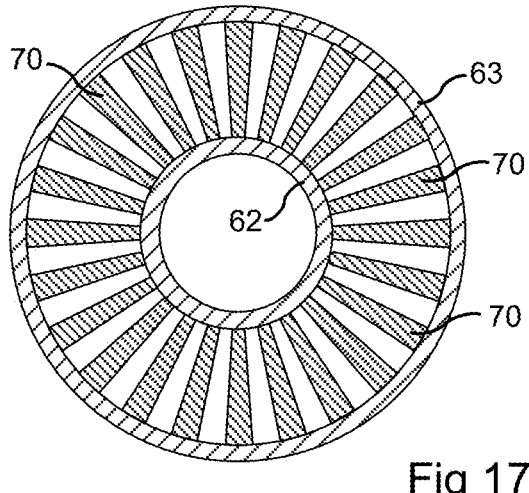
FIG. 17 is a cross section on line N-N of FIG. 15.

FIGS. 15 to 19 show a different constructional arrangement. A chamber 61 has an annular cross section, with a cylindrical inner wall 62 and a larger cylindrical outer wall 63. There is a fluid inlet 64 at the upstream end of the chamber 61 and a fluid outlet 65 at the downstream end. The upstream first portion of internal structure within the chamber is provided by four annular plates 66, 67. The downstream second portion carries pillars 70 which have a square cross section as shown in FIG. 16, but taper slightly from the external wall 63 to the internal wall 62.

Figure 18:
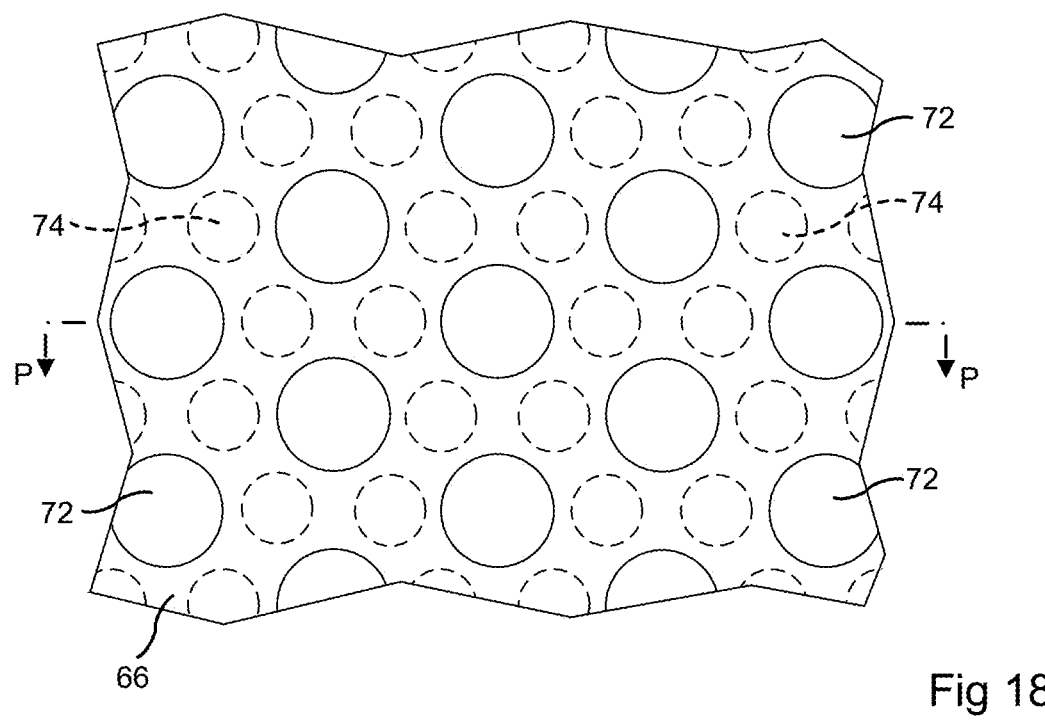
FIG. 18 shows a portion of a plate forming part of the internal structure within the chamber of FIG. 15.
Figure 19:
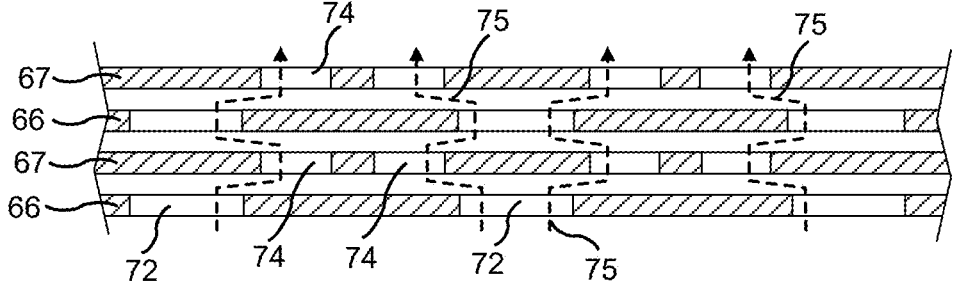
FIG. 19 is a cross section of four plates on line P-P of FIG. 18.

The first and third plates 66 are identical. The second and fourth plates 67 are identical to each other but different from the plates 66. As shown by FIG. 18, the first plate 66 has a large number of through holes 72 in a regular array. The next plate 67 has a larger number of smaller holes 74, shown with broken lines. These are also in a regular array, but holes 72 in plate 66 are aligned with unapertured areas of plate 67 and holes 74 in plate 67 are aligned with unapertured areas of the next plate 66. Because the holes 72, 74 are in regular arrays, the unapertured areas of the plates 66, 67 which are obstructions to flow are also in regular arrays. When fluid flows through holes 72 in the first plate it is obstructed by unapertured areas of the second plate 67 and is compelled to turn to flow in a radial direction, before turning again to flow through the holes 74 in the second plate. Flow in the axial direction through the holes 74 is then obstructed by unapertured areas of the third plate which (as mentioned) is identical to the first plate. Paths of flow with these successive changes of direction are shown by chain dotted lines 75 in the cross section which is FIG. 19. As fluid flows through the length 68 of the first portion of the internal structure, it is subjected to more shear stress and suffers more pressure drop than when it flows through an equal length, such as length 69 of the second portion.

Figure 20:
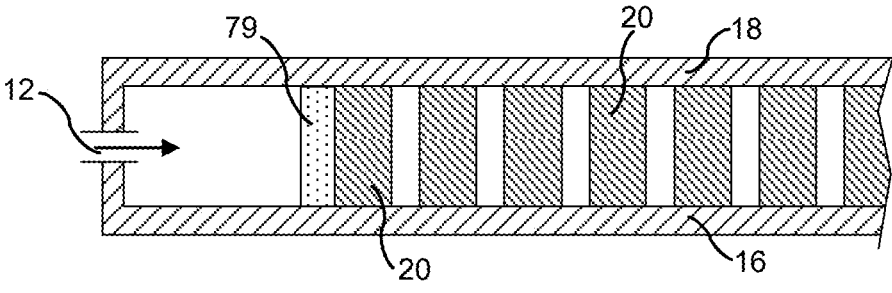
FIG. 20 is a cross section of part of another chamber.

FIG. 20 is a similar cross section to FIG. 9 but shows another way to provide a difference between an upstream first portion and a downstream second portion. The second portion is an array of pillars 20 similar to the pillars in FIGS. 8 and 9. Immediately upstream of these pillars is a pad 79 of a porous fibrous material. The irregular shapes of the pores between fibres compel the streamlines of flow through the pad to make many changes of direction. The small size of the pores and the small diameter of the fibres causes the changes of direction to have a small radius of curvature and induces elastic turbulence without stagnant zones in the pad 79.

Chambers with internal structures as described above may be used in equipment where elastic turbulence is used to enhance transfer of heat into or out of a fluid, and in electrochemical half cells where elastic turbulence enhances transport of chemical species to or from electrodes.

Figure 21:
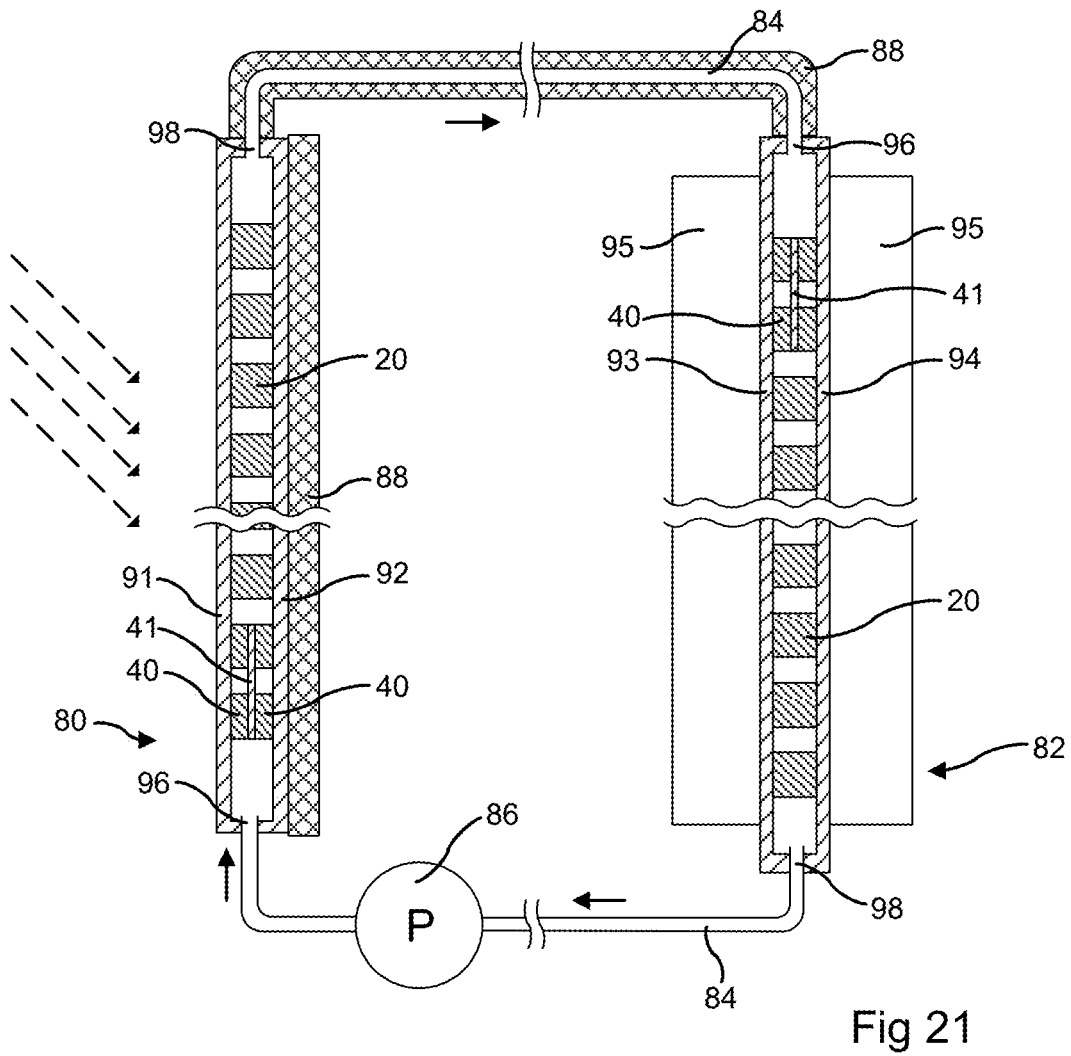
FIG. 21 is a diagrammatic cross section of a heat exchange circuit.

FIG. 21 shows an example embodiment of chambers with internal structure similar to that in FIGS. 8 to 11 when the fluid is the working fluid of a system for transferring heat energy from a heat source to a volume of water. At the left of FIG. 21 a device 80 is exposed so as to be heated by the sun. The device 82 at the right of FIG. 21 is immersed in a body of water. The two devices 80, 82 are joined by piping 84 for circulating working fluid. Pump 86 propels the working fluid around the circuit in the direction shown by arrows. The section of piping which carries hot working fluid is surrounded by heat insulation 88. The devices 80 and 82, along with piping 84 and pump 86 form a heat exchange circuit.

The device 80 has a cuboidal casing defining a chamber through which the working fluid is pumped. The casing face 91 which is exposed to the heat of the sun is the interface between the working fluid inside the casing and the source of heat. This is made of a thermally conductive material, such as copper or aluminum. The opposite surface 92 has heat insulation 88 against it to reduce heat loss. The heat exchange device 82, which is immersed in water to be heated, has a cuboidal casing with main walls 93, 94 which is the interface through which heat energy leaves the working fluid. Fins 95 projecting from the casing walls 93, 94 assist the conduction of heat from the casing to the surrounding water. Inlets to the chambers are indicated at 96 and outlets are indicated at 98.

Both of these devices 80, 82 have internal structure as in FIGS. 8 to 11. In an upstream first portion, arrays of pillars 40 with square cross section extend from both sides of plate 41 to the walls of the casing. The downstream second portion is an array of pillars 20 provided by bars of square cross section which extend across the casings from one face to the other. These pillars 20 and 40 are in regular arrays with pillars of triangular section at the edges of the arrays (similarly to pillars 26 in FIG. 1) to continue the regularity of flow paths to the edges of the casings.

The working fluid circulated through the heat transfer devices 80 and 82 is an aqueous solution of high molecular weight flexible polymer, which, for example, may be linear partially hydrolyzed polyacrylamide with a mean molecular weight of 18 to 20 MegaDaltons. The working fluid also contains a small concentration of a biocide to prevent biological degradation of this polymer.

The circulating pump 86 propels the working fluid such that fluid entering the device 80 at its inlet 96 is in a state of laminar flow. Flow entering the device 82 is also laminar. This flow rate is such that when the working fluid flows through the arrays of pillars 40 in the upstream first portions of the internal structure within the devices 80 and 82 it is put into a state of elastic turbulence. In the device 80, the elastic turbulence has the effect of transferring heat energy from the casing surface 91 to the working fluid more rapidly than would be transmitted by conduction under conditions of laminar flow without elastic turbulence. Similarly, in the device 82, elastic turbulence increases the rate of transfer of heat from the working fluid to the casing of the device 82, from which the heat energy passes on to the fins 95 and to the water surrounding the device 82.

The piping 84 connecting the devices 80, 82 to each other and to the pump 86 carries the same flow rate (in volume per unit time) as passes through the devices 80, 82. This piping 84 is designed with sufficiently large dimensions that the flow speed within it is low so that, as well as being in a state of laminar flow, the fluid flowing in the piping is subjected to low shear.

Figures 22, 23:
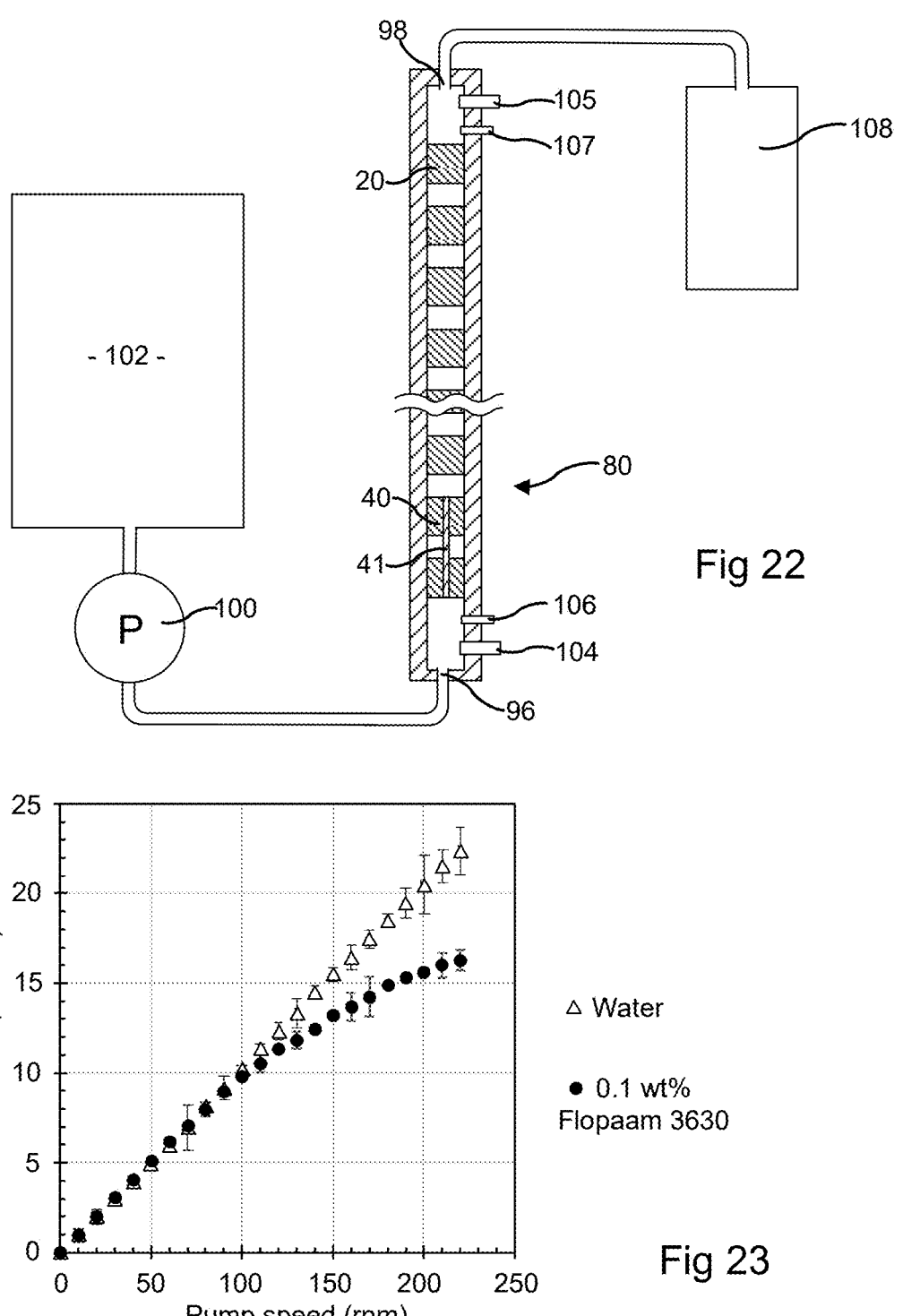
FIG. 22 is a diagrammatic view of apparatus to determine flow rate for a heat exchange device of FIG. 21.
FIGS. 23 and 24 show experimental results obtained with an embodiment of such apparatus.

A minimum flow rate required to cause elastic turbulence in a heat exchange device and the rate of heat transfer to or from the circulating working fluid can both be determined experimentally. Apparatus for this is shown in FIG. 22. In this apparatus the heat exchange device 80 (or a preliminary model for such a device) is connected to a pump 100 which delivers liquid from a tank 102 which is maintained at a fixed temperature. Pressure sensors 104, 105 and temperature sensors 106, 107 are fitted at the inlet and outlet of the device 80. The temperature sensors 106, 107 may be thermocouples. The outlet 98 from the device 80 is connected to a graduated vessel 108 for measuring volume of liquid which has been pumped through the device 80 in a chosen interval of time, and thereby determining the flow rate.

When liquid from the tank 102 is pumped through the device 80 there will be a pressure drop between the inlet pressure sensor 104 and the outlet pressure sensor 105. When the flow rate through the device 80 is very low, the flow will be laminar, without any elastic turbulence. The minimum flow rate to cause elastic turbulence in the device 80 can be found by progressively increasing the pump speed to increase the flow rate and plotting the pressure drop between sensors 104, 105 against flow rate. This plot will show a change in slope on reaching the flow rate at which elastic turbulence begins.

Figure 24:
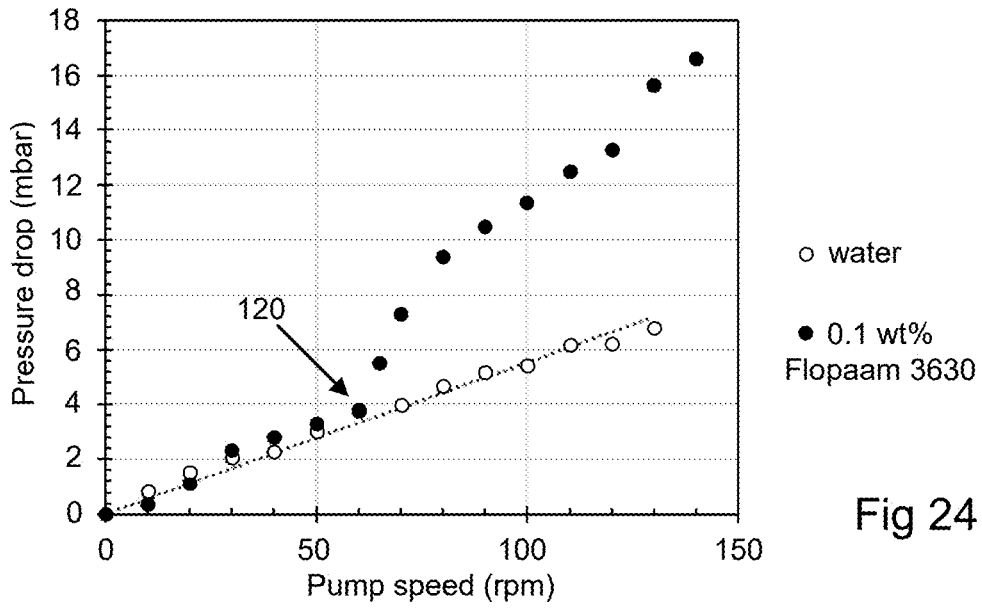

This is illustrated by the following description of experimental work with apparatus comprising a chamber with internal structure which is an array of obstructions. The results of the experiments are shown in FIGS. 23 and 24. An initial calibration determined relationships between pump speed and flow rate. The tank 102 was filled with water. The pump was used to propel water through the chamber at progressively increasing flow rates. The pump speeds and the flow rates measured downstream of the chamber were recorded and are shown in FIG. 23 (triangle points). This calibration procedure was then repeated with an aqueous solution containing 0.1 wt % of Flopaam 3630 which is a linear partially hydrolyzed polyacrylamide with mean molecular weight of 18 to 20 MegaDaltons. This gave the non-linear plot also shown in FIG. 23 (circular points).

FIG. 24 shows the measured pressure drops plotted against pump speed. With water the plot was approximately linear (as would be expected because water is a Newtonian fluid) but with the polyacrylamide solution there was a very sharp change in the slope of the plot at the point 120, indicating that the flow rate at this pump speed was the minimum required to cause elastic turbulence with that polyacrylamide solution and chamber. Flow rate at the pump speed of point 120 can of course be determined from the plot in FIG. 23.

Figure 25:
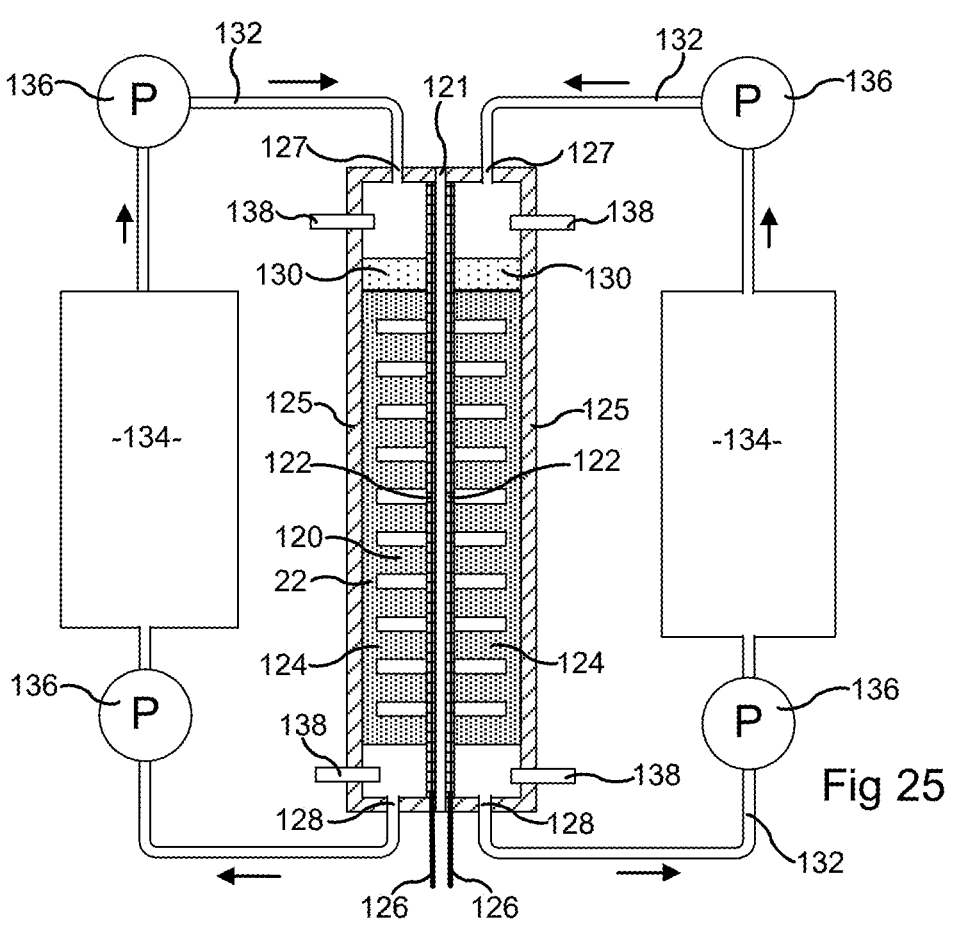
FIG. 25 is a diagram showing component parts of a flow battery, with the flow guides and membrane in cross section.
Figure 26:
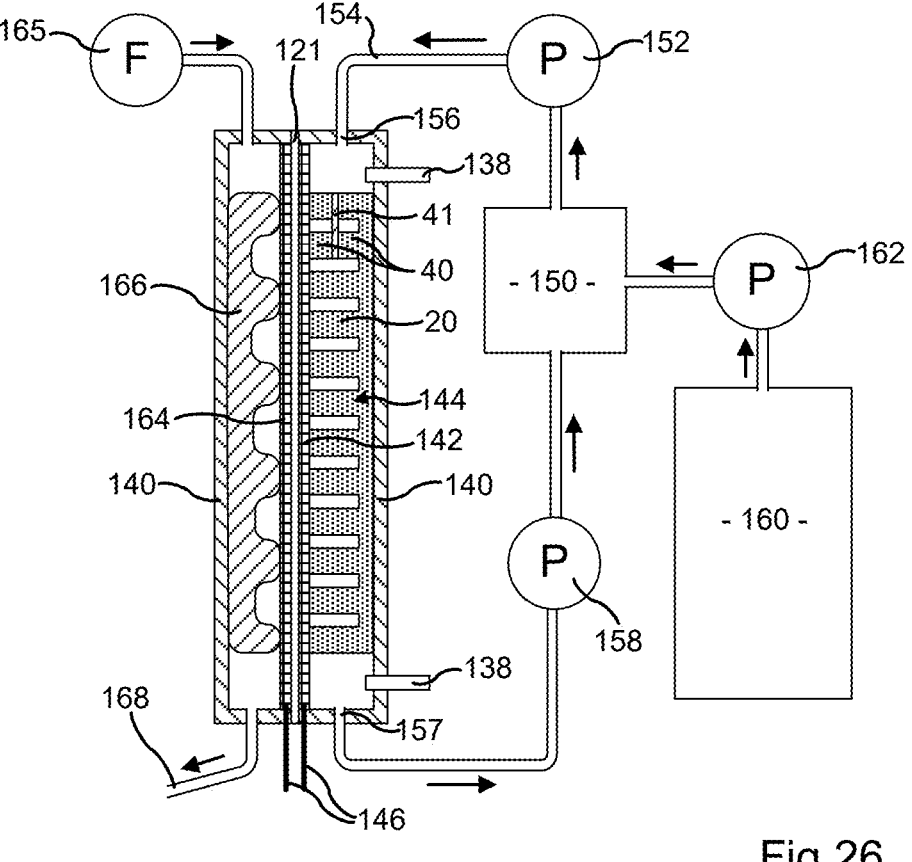
FIG. 26 is a diagram showing component parts of a fuel cell.

FIGS. 25 and 26 show example embodiments of chambers with internal structures as described above when used in electrochemical half-cells in which the fluid is an electrolyte pumped through a half-cell and elastic turbulence is made to occur in contact with an electrode.

Flowing electrochemical cells are used in various categories of equipment. One of these is a flow battery which normally includes two half-cells separated by a membrane which separates the fluids of the two half-cells but which allows passage of ions which are required to cross from one half-cell to the other. During charge and discharge, in each half-cell, a fluid containing one or more species which undergo electrochemical reaction is pumped through the half-cell from an associated storage vessel and after passing through the half-cell, is either discharged to another storage vessel or circulated back to the vessel it came from. Flow batteries have the characteristic that the storage capacity for electrical energy is not determined by the size of the electrochemical cell but by the amount of fluid which is held in the storage vessels.

FIG. 25 shows a flow battery with a central membrane 121, which separates two half-cells, and is shown with exaggerated thickness. There is an electrochemical half-cell at each side of the membrane. Each half-cell has a thin porous electrode 122 next to the membrane 121 and a flow guide 124 which is directly adjacent to this electrode 122 and is held in position by a casing 125 of the flow battery. Electrical connections to the electrodes are shown at 126.

In each half-cell, the casing 125 and the electrode 122 provide a chamber for flow of fluid entering at inlet 127 and leaving at outlet 128. Internal structure within each chamber has an upstream first portion which is a porous pad 130 of fibrous material and a downstream second portion which is the flowguide 124. Each flow guide is a regularly spaced array of pillars with square cross section extending from a planar base plate 22 as shown by FIGS. 1 to 4. The pillars 20 extend from the base plate 22 to the electrode 122.

In the arrangement shown by FIG. 25 the flow guides 124 could be made of graphite or another conductive material in order to conduct electricity from or to the thin electrodes 122. However, if the thin electrodes 122 have sufficient electrical conductivity, they may be connected to cables 126 as shown and the flow guides 124 could be made of an electrically insulating material. They could be made by an additive manufacturing process such as 3D printing.

The inlets 127 and outlets 128 of the half-cells are connected by piping 132 to storage tanks 134 of electrolyte fluids which are circulated through the half-cells by pumps 136 during charge and during discharge. It is desirable to construct the piping 132 without sharp bends or other features which can cause a pressure drop.

The electrolyte fluids flowing through each of the half-cells are aqueous solutions and they include dissolved high molecular weight flexible polymer, which may, for example, be partially hydrolyzed linear polyacrylamide with a mean molecular weight above 15 Megadaltons so that these electrolyte fluids have elastic properties and are capable of displaying elastic turbulence. When the flow entering from each inlet passes through the porous pad 130 the changes of flow direction brought about by the irregular small pores of the pad cause elastic turbulence to occur. The flow guides 124 then receive the electrolytes from the pads in a state of elastic turbulence and sustain this elastic turbulence as the electrolyte fluids pass through the flow guides. The flowing electrolytes flow to the porous electrodes 122 and then into the pores of those electrodes. The mixing of flow brought about by the elastic turbulence enhances the transport of reactive species to the surfaces of the electrodes and the transport of reaction products away from the electrodes. The increased transport of chemical species as a result of elastic turbulence will increase the maximum current flow in the half-cell, compared with a half-cell of the same construction but without the high molecular weight flexible polymer in the electrolyte fluid.

Pressure sensors 138 are fitted near to the inlets 127 and outlets 128. These allow measurement of the pressure drop between inlet and outlet of a half-cell. This measurement of pressure drop can be used to detect the onset of elastic turbulence by pumping fluid at progressively increasing flow rates until there is a sudden change in gradient of a plot of pressure drop against flow rate (or pump speed) as described above with reference to FIGS. 22 and 23.

A very considerable number of compounds able to undergo electrochemical redox reaction have been suggested for use in flow batteries and this is still a subject of research. A number of these compounds have been reported to be usable under mild conditions with neutral or near-neutral pH. By way of example, a possibility for the fluid at a positive electrode is an aqueous solution of iodine and an iodide which can reversibly form tri-iodide ions in the reaction:

$$I_2 + I^- + 2e^- \rightleftharpoons I_3^-$$

A possibility for the fluid at the negative electrode is an aqueous solution of 2,6-dihydroanthroquinone which can undergo electrochemical reduction to the corresponding hydroquinone. Also, derivatives of 2,6-anthroquinone obtained by reaction at the hydroxyl groups have been suggested in a number of articles including Kerr et al, ACS Energy Letters vol 8 pages 600-607 (2023) and Jin et al ACS Energy Letters vol 4 pages 1342-48 (2019).

Further possibilities for electrochemically reactive species are other quinones, ferrocenes and bipyridyl compounds. The latter are also known as viologens. DeBruler et al in ACS Energy Letters vol 3 pages 663-668 (2018) have described an experimental flow battery in which one half-cell contained 1,1'-bis[2-sulfonatopropyl]-4,4'-bipyridinium and the other half-cell contained iodine and iodide as above. The separating membrane was a cation exchange membrane. Another experimental flow battery for the electrochemistry using an anion exchange separating membrane, a substituted viologen in one half-cell and a substituted ferrocene in the other has been described by Lv et al in ACS Energy Letters vol 7 pages 2428-2434 (2022).

FIG. 26 shows a further embodiment of this disclosure which is a fuel cell using methanol as fuel. It has a membrane 121 separating two half-cells within a casing 140. In one half-cell, to the right as seen in FIG. 26, a thin porous electrode 142 is adjacent to the membrane 121. A flow guide 144 is next to this porous electrode 142. The electrode 142 incorporates a catalyst for the electrochemical reaction of methanol. Electrical connections for the generated electricity are indicated at 146.

The flow guide has the same construction as the internal structure shown by FIGS. 8 to 11. It is an array of square section pillars. The first three rows are the upstream first portion of the internal structure and are formed of short pillars 40 on each side of a plate 41 which is parallel to the electrode 142. Plate 41 is mid-way between the electrode 142 and the casing 140. Downstream from the plate 41 the pillars 20 extend the full distance from the casing 140 to the electrode 142.

Electrolyte fluid is an aqueous solution of methanol containing dissolved high molecular weight flexible polymer, which may for example be partially hydrolyzed linear polyacrylamide with a mean molecular weight above 15 Megadaltons. This fluid is drawn from mixing tank 150 by pump 152 and pumped through piping 154 to the inlet 156 of the half-cell and thus to the flow guide 144. The aspect ratio of the face-to-face gaps between the short pillars 40 is less than two and flow between these pillars 40 initiates elastic turbulence. The elastic turbulence is sustained as the electrolyte fluid flows between the longer pillars 20. The elastic turbulence increases the transport of methanol to the thin catalytic electrode 142. The electrolyte fluid, with a depleted concentration of methanol flows through the outlet 157 and is returned to the mixing tank 150 by pump 158. Additional methanol is drawn from fuel tank 160 and delivered to the mixing tank 150 by pump 162 to maintain a steady concentration of methanol in the mixing tank and consequently in the fluid entering the flow guide 144.

In the half-cell to the left, atmospheric oxygen combines with hydrogen ions which pass through the membrane 121. A thin porous electrode 164 next to the membrane 121 incorporates a catalyst for this electrochemical reaction. A fan 165 blows air into a flow guide 166 which has a serpentine channel, not shown in full, to give a distributed flow of air to the catalytic electrode 164. Wet air with a depleted oxygen content leaves as exhaust 168.

Various embodiments of this disclosure have been set out above. These are intended to assist understanding of this disclosure, but not to limit it in any way. The scope of this disclosure is defined by the following claims. In particular, it should be appreciated that any of the possibilities for internal structure within a chamber shown and described with reference to FIGS. 8 to 20 could be used with any of the possible forms of equipment shown by FIGS. 21 to 26. It should also be appreciated that any features or possibilities described in combination may, where it is practical to do so, be used individually. Also, features or possibilities mentioned in the following claims or described in any embodiment may be used in any other embodiment, in so far as it is practical to do so and in particular where two or more of the following claims are dependent on the same preceding claim, the reader should understand that the present disclosure includes any possible combination of any two or more or all of those dependent claims with each other and with that preceding claim.

The invention claimed is:

1. A chamber for through flow of a fluid which is capable of elastic turbulence, wherein the chamber has an inlet, an outlet, and an internal structure within the chamber configured to compel streamlines of flow through the internal structure to undergo a plurality of successive changes of direction, wherein the internal structure comprises a first portion and a second portion downstream from the first portion which are both configured to apply stress to the flow of liquid through the chamber, the second portion is configured to apply less stress per unit length in the overall direction of flow than the stress per unit length applied by the first portion, the internal structure further comprises a third portion downstream of the second portion and a fourth portion downstream of the third portion, the third portion is configured to apply more stress per unit length in the overall direction of flow than the stress per unit length applied by the second portion, and the fourth portion is configured to apply less stress per unit length in the overall direction of flow than the stress per unit length applied by the third portion.

2. The chamber of claim 1, wherein the second portion has a greater length in the overall direction of flow than the first portion.

3. The chamber of claim 1, wherein the first portion is at an upstream end of the internal structure of the chamber.

4. The chamber of claim 1, wherein the second portion is immediately downstream of the first portion.

5. The chamber of claim 1, wherein the second portion is at a downstream end of the internal structure.

6. The chamber of claim 1, wherein at least one of the first portion and the second portion comprises a plurality of rigid obstructions positioned to compel changes in the direction of flow.

7. The chamber of claim 6, wherein the rigid obstructions are positioned in an array which comprises a plurality of rows of obstructions spaced apart across the overall direction of flow, where gaps between the obstructions in one row are aligned, in the overall direction of flow, with the obstructions in an adjacent row.

8. The chamber of claim 1, wherein the first portion comprises a porous pad of filaments with a network of irregular pores between the filaments.

9. The chamber of claim 1, wherein the first portion and the second portion of the internal structure each comprise a plurality of rigid obstructions to flow with gaps for flow between the obstructions, the obstructions being positioned to compel changes in the direction of flow, and the first portion and the second portion differ in one or more of shape or size of the obstructions or shape or size of the gaps between the obstructions.

10. The chamber of claim 9, wherein the rigid obstructions in both the first portion and the second portion are positioned in arrays which comprise a plurality of rows of obstructions spaced apart across the overall direction of flow, where the gaps between the obstructions in one row are aligned, in the overall direction of flow, with the obstructions in an adjacent row.

11. The chamber of claim 9, wherein the obstructions and the gaps in the first portion compel the streamlines of the flow to turn with smaller radius of curvature or through a greater angle than the obstructions and the gaps in the second portion.

12. The chamber of claim 9, wherein the gaps between the obstructions in the second portion are larger than the gaps between the obstructions in the first portion.

13. The chamber of claim 9, wherein the first portion of the internal structure comprises one or more intermediate walls extending in the overall direction of flow with the rigid obstructions to the flow and the gaps for the flow between the obstructions at both sides of each intermediate wall.

14. The chamber of claim 1, wherein the first portion of the internal structure comprises a plurality of plates positioned transverse to the overall direction of flow, each plate has a plurality of apertures through the plate, and alternate plates are positioned so that flow through the apertures of a plate is compelled to change direction by the next plate in the overall direction of flow.

15. The chamber of claim 1, wherein the second portion comprises a plurality of subsections which differ from each other in one or more of shape or size of obstructions or shape or size of gaps between the obstructions.

16. The chamber of claim 1, wherein volume within the first portion and the second portion of the internal structure is at least 50 ml.

17. A system comprising:
the chamber according to claim 1, and
a pump for pumping the fluid through the chamber.

18. The system of claim 17, wherein the system is a system for moving heat energy and the chamber is a heat transfer device wherein a chamber wall in contact with the flowing fluid is an interface through which heat energy is transferred to or from the flowing fluid.

19. The system of claim 18, wherein the heat transfer device is part of a heat exchange system comprising a second heat transfer device at a different location, pipework connecting the pump and the heat transfer devices as a closed circuit containing the fluid.

20. The system of claim 17, further comprises a flowing electrochemical half-cell with an electrode in contact with the fluid in the chamber and the fluid contains a constituent able to undergo electrochemical reaction at the electrode.

21. The system of claim 20, wherein the electrode is porous, so that electrolyte in the chamber can flow into pores within the electrode.

22. A method for causing fluid to display elastic turbulence, comprising: pumping the fluid, which contains a solute, through the chamber according to claim 1.

23. The method of claim 22, wherein pumping the fluid induces elastic turbulence within the first portion over at least 80% of a cross section of the chamber transverse to the overall direction of the flow and sustains elastic turbulence over at least 80% of the cross section of the chamber throughout the flow through the second portion of the internal structure.

* * * * *